United States Patent
Saushkin

(10) Patent No.: US 8,340,274 B2
(45) Date of Patent: Dec. 25, 2012

(54) SYSTEM FOR ROUTING INTERACTIONS USING BIO-PERFORMANCE ATTRIBUTES OF PERSONS AS DYNAMIC INPUT

(75) Inventor: Oleg Saushkin, Moscow (RU)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 1008 days.

(21) Appl. No.: 12/340,977

(22) Filed: Dec. 22, 2008

(65) Prior Publication Data

US 2010/0158238 A1 Jun. 24, 2010

(51) Int. Cl.
*H04M 3/00* (2006.01)
*H04M 5/00* (2006.01)

(52) U.S. Cl. ......... 379/265.06; 379/265.01; 379/265.12; 379/309

(58) Field of Classification Search ............. 379/265.06, 379/265.01, 265.12, 309
See application file for complete search history.

(56) References Cited

U.S. PATENT DOCUMENTS

| | | | | |
|---|---|---|---|---|
| 5,903,641 A * | 5/1999 | Tonisson | .................. | 379/265.12 |
| 6,959,080 B2 * | 10/2005 | Dezonno et al. | ......... | 379/265.07 |
| 8,054,965 B1 * | 11/2011 | Wu et al. | .................. | 379/265.11 |
| 2007/0121824 A1 * | 5/2007 | Agapi et al. | ............. | 379/88.18 |
| 2008/0002823 A1 * | 1/2008 | Fama et al. | ............. | 379/265.12 |

* cited by examiner

*Primary Examiner* — Quynh Nguyen
(74) *Attorney, Agent, or Firm* — Christie, Parker & Hale, LLP

(57) ABSTRACT

A system for routing an interaction has a queue for staging the interaction, a router running a routing strategy for routing the interaction, and a number of object models maintained for a number of agents, the object models defining one or more agent skills, the values of the object models dynamically affected by real-time bio-metrics of the agents obtained through ongoing monitoring of voice and input actions of the agents. The routing strategy routes the interaction based on comparison of the dynamically-affected skill values of the agents, as evidenced in the object models.

14 Claims, 6 Drawing Sheets

SYSTEM FOR ROUTING INTERACTIONS USING BIO-PERFORMANCE ATTRIBUTES OF PERSONS AS DYNAMIC INPUT

BACKGROUND OF THE INVENTION

1. Field of the Invention

The present invention is in the field of electronic communications including telephony, data network telephony (DNT) and Internet protocol network telephony (IPNT) and pertains particularly to a system for routing interactions using bio-performance attributes of agents as dynamic input.

2. Discussion of the State of the Art

In the field of telephony communications, state-of-art contact centers are available to help customers of companies buy products and services, gain technical assistance, answer questions, and so on. Modern contact centers, also termed call centers or communications centers, are typically computer telephony integrated (CTI) and employ agents and/or knowledge workers to help customers. Automated systems have interactive voice response systems and automated mailing systems are available for treating customers whose goal does not include talking with a live agent.

The contact center has agent stations including personal computers (PCs) connected to local area network (LAN) and agent telephones connected also to the LAN or to a central telephone switch located within the center or leased from a service provider. The center may also be accessed through electronic messaging like email, instant messaging and chat interaction. Incoming calls and other communications are handled by automated systems such as by an interactive voice response (IVR) system or automated messaging reply system unless live assistance is suggested or required to handle a call.

Routing logic within a call center is typically implemented in a router or routing server and relies on static, and in some cases dynamically changing data to determine the best fit destination for routing an interaction. In most cases the data relied upon for routing is relative to such conditions in the center as agent availability, agent skill type, time of day, call load, and other criteria. Static elements may also be involved in event routing like switches, queues, IVR ports, and so on.

In some contact center applications, voice recognition technology is used to not only communicate with a customer, but also to attempt to gauge the current mood of the customer relative to doing business. For example, if the customer is determined to be angry or upset, by virtue of using mood detection technology at the IVR, then some other customer treatment may be ordered by the system than the treatment first contemplated by the system. In a typical case it is a redirect from self-help to live assistance so an agent may alleviate the frustration of the customer and perhaps elicit a sale from the customer.

Agents in a contact center are trained and are often rated in skill level and other performance factors, such as typing speed and efficiency in handling a call, which is often measured in time from agent pickup to a successful conclusion. It has occurred to the inventors that agent performance levels within the call center will waver somewhat according to how the agent feels, call and message load on the agent, time the agent has worked on a particular campaign, and other somewhat personal factors, such as temperament of the agent, agent alertness, and agent attentiveness. Moreover, general performance output of an agent may cycle from minimum too maximum and back to minimum output according to some biorhythmic cycle. Therefore it is important to attend to the desires and needs, and to some extent comfort level of an agent to ensure the agent has all of the required tools, training, and support for performing at a top level within the contact center at a maximum level of consistency. However, there may always be periods of less-than-maximum output for a contact center agent, perhaps even including performance below acceptable levels.

Current contact center routing based on mood or temperament levels focuses only on the customer with the goal of making the customer feel important to the process. What is clearly needed is a system for considering the bio-performance characteristics of agents working within the system when making routing decisions based on current levels of agent performance as an additional consideration in normal routing to further optimize contact center efficiency.

SUMMARY OF THE INVENTION

The problem stated above is that intelligence is desirable for a routing system, but many of the conventional means for providing routing intelligence, such as call center statistics deal mostly with availability and skills match and do not address real-time performance metrics of the agent. The inventors therefore considered functional elements of an intelligent routing system looking for elements that exhibit dynamically that could potentially be harnessed to provide intelligent routing but in a manner that would improve contact center efficiency and preserve customer loyalty.

Every routing system is driven by interaction demand and routing system business rules or policy. Most such systems employ interaction routers, servers and data processors to conduct intelligent routing of interactions based on customer need and availability of resources. A router executing some routing strategy is typically a part of such apparatus.

The present inventor realized in an inventive moment that if, at the point of need in a routing process, the actual values of equally skilled contact center agents could be determined for facilitation of an intelligent routing choice among more than one destination, significant optimization of efficiency in the process might result. The inventor therefore constructed a unique routing system for routing interactions that allowed real-time bio-metric states of agents to be considered as a variable that might affect an agent's classic skill level to more intelligently determine a best match for an interaction requiring live assistance. Significant improvement results, with no perceptible delay in the overall interaction routing process created.

Accordingly a system for routing an interaction is provided, comprising a queue for staging the interaction, a router running a routing strategy for routing the interaction, and a number of object models maintained for a number of agents, the object models defining one or more agent skills, the values of the object models dynamically affected by real-time bio-metrics of the agents obtained through ongoing monitoring of voice and input actions of the agents. The routing strategy routes the interaction based on comparison of the dynamically-affected skill values of the agents, as evidenced in the object models.

In another aspect a method for representing real or predictive fluctuations in values of skills of an agent assigned to live interaction for use in routing is provided, comprising the steps of (a) modeling one or more skills of the agent as a configuration model with skill value attributes for each skill defined; (b) modeling one or more bio-performance states of the agent as a bio-performance object integral to the configuration model; (c) monitoring the bio-metrics of the agent during live interaction; (d) discovering during monitoring one or more changes in one or more bio-performance states of the agent; (e) updating the one or more bio-performance state changes to the bio-performance object; and (f) changing one or more skill value attributes according to the updated state changes.

BRIEF DESCRIPTION OF THE DRAWING FIGURES

DETAILED DESCRIPTION

The inventors provide a system and methods for monitoring agent bio-characteristics and calculating the affect of bio-status of an agent on classic skill level performance over time. The real time changes in real performance levels affected by bio-characteristics are considered when routing interactions to the agents to improve efficiency in the contact center.

Figure 1:
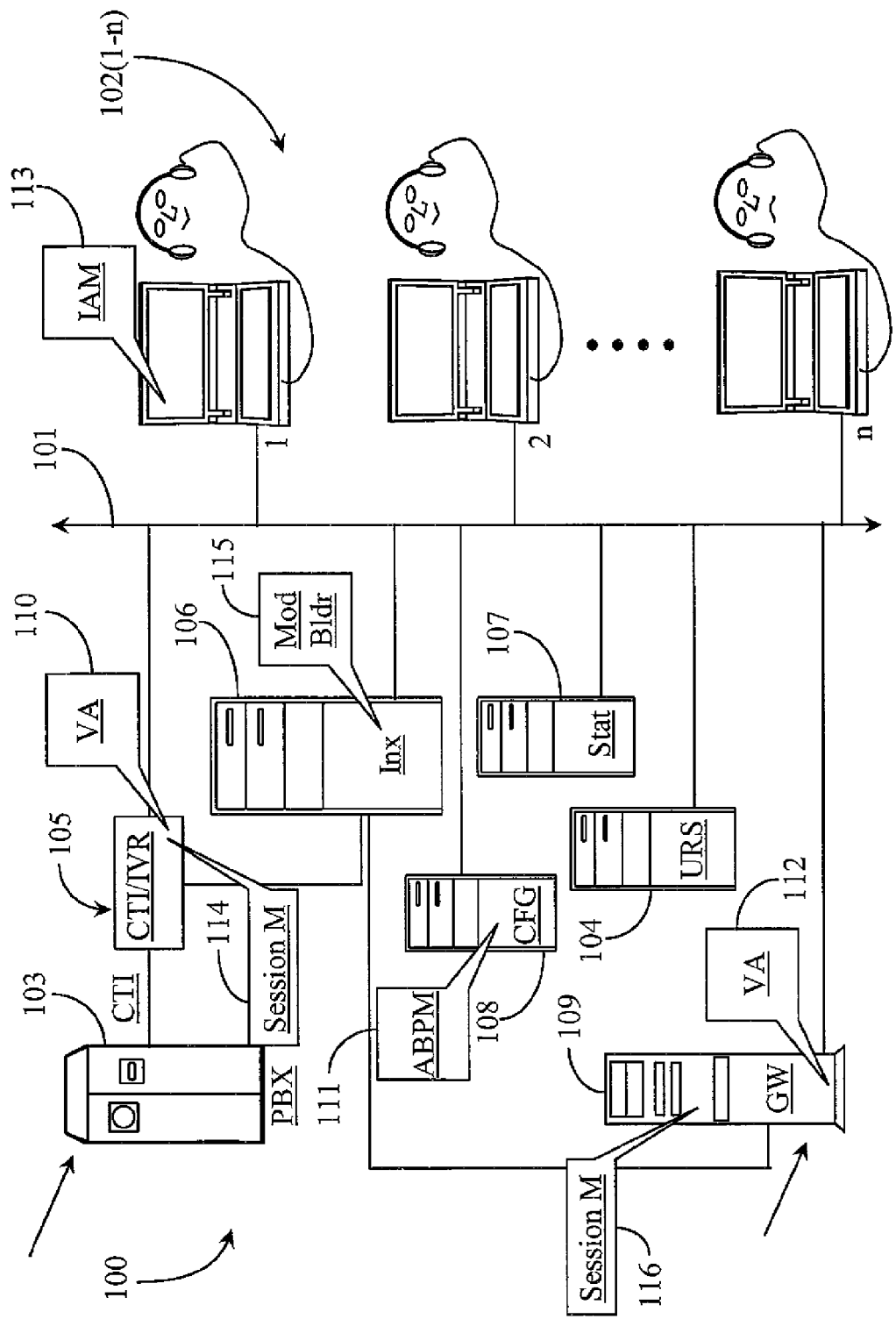
FIG. 1 is an architectural overview of a bio-contact center according to an embodiment of the present invention.

FIG. 1 is an architectural overview of a bio-contact center 100 according to an embodiment of the present invention. Contact center 100 is termed a bio-contact center by the inventors in part because certain bio-characteristics of contact center agents are monitored and the effect of these real-time characteristics on current agent skill levels calculated for routing purposes is considered in interaction routing. Center 100 may be referred to as bio-center 100 or simply as contact center (CC) 100.

CC 100 has connection in this example to a telephone network via a central office telephone switch 103. Switch 103 may be a private branch exchange (PBX) switch as illustrated in this example or it may be an automated call distributor (ACD or some other type of hard or soft telephone switch. Switch 103 is computer telephone integrated (CTI) by a CTI processor 105 connected to the switch by a CTI link. CTI processor 105 has a digital medium installed thereon or accessible thereto by processing link for storing logic and software used to provide intelligent command to switch 103. In this example CTI processor 105 has an instance of an interactive voice response (IVR) software and a voice session monitor (Session M) 114a.

Calls arriving at switch 103 from outside the contact center (telephone network) are represented herein by a directional arrow leading into the switch. The telephone network may be a public switched telephone network (PSTN) or some other telephone carrier network including public, private, and wireless carriers, and also voice over IP (VoIP) calls.

In this example calls that arrive at switch 103 are represented within an interaction server (Inx) 106. Inx 106 has a machine-readable medium installed thereon or accessible thereto by processing link for storing software and logic for representing a variety of interactions in real time in an abstract way using an abstract markup language such as open media language (OML), or an extensible markup (XML) based language. An interaction server is not absolutely required in order to practice the invention as long as a CTI processor/server is available. When a call arrives at switch 103 notification thereof is sent via data link to Inx 106 and an open media session is created for the interaction.

It is noted herein that a voice application server adapted to store voice applications for IVR presentation may be assumed present in this example although it is not specifically illustrated. A universal routing server 104 is provided within CC 100 and is adapted to serve routing strategies for determining final routing destinations for interactions arriving at the center. URS 104 has a machine-readable medium installed thereon or accessible thereto via a processing link for storing executable routing strategies for routing interactions. CTI processor 105 Inx 106 and URS 107 are connected to a local area network (LAN) 101 within center 100. LAN 101 is enabled for transfer control protocol over Internet Protocol (TCP/IP).

CC 100 includes an Internet gateway (GW) 109 for connecting LAN 101 to the Internet network to provide Internet connectivity to all capable LAN-connected appliances. GW 109 may be a router for routing IP interactions such as chat requests, text messaging, and email to appropriate destinations within the contact center. A message routing system is not illustrated in this example but may be assumed present in a state-of-art contact center such as is represented by CC 100. GW 109 may also server as an IP voice interface for IP calls coming in from the external network. GW 109 includes a voice analyzer 112 and a session monitor 114b. The external network is the Internet network in this example. All interactions coming into contact center 100 from the Internet are represented by a directional arrow leading into gateway 109. Interactions arriving at gateway 109 are represented in Inx server 106 along with telephone calls from switch 103. GW 109 is connected to Inx 106 by a separate data network as is CTI processor/server 105.

CC 100 includes a configuration server (CFG) server 108 having a machine-readable medium installed thereon or accessible thereto by a processing link for storing CC configuration objects and supporting data. CC 100 also includes a statistics (Stat) server 107 for serving real-time statistics used by routing processes to determine such statistics as estimated waiting time (EWT) in queue, agent availability, and so on. Other equipment types may be available within center 100 that are not illustrated herein without departing from the spirit and scope of the present invention. The equipment illustrated is only meant to be exemplary of contact center equipment known to the inventor, and other equipment might be available depending on the capabilities of the center.

LAN 101 supports a number of agent workstations 102 (1-n) for handling contact center business including handling calls arriving at switch 103 and interactions arriving through GW 109. Agent station 102-1 includes a LAN-connected computer and a telephone headset for answering voice calls. In one embodiment each agent station 102 (1-n) includes an agent telephone connected to a switch like switch 103 by internal telephone wiring. In this example the agents are equipped with desktop telephone applications and answer calls using the available headsets.

In practice of the present invention, certain agent bio-states are monitored during contact center business conducted by the agents. For example, voice calls arriving at switch 103 are monitored using session monitor 114a, which includes a voice analyzer 110. Voice analyzer 110 is adapted to listen to both customer and agent voice dialogue and determine if any voice characteristics are present that might suggest a different routing strategy should be pursued. Voice volume levels (decibels), voice tone, voice inflection pattern, speed of dialogue, use of profanity, correctness of dialogue (guided by script) and other like characteristics can be detected using voice analyzer 110. The center has the normal voice patterns of each agent on file and can determine variant voice characteristics, some of which may be determined through comparison with normal voice patterns.

Another instance of voice analyzer is installed on GW 109 as voice analyzer 112. Voice analyzer 112 may be the same as analyzer 110. Session monitor 114b running on GW 109 monitors live text sessions like Instant message (IM) session or chat sessions and voice interaction such as voice over Internet protocol (VoIP) sessions and voice over extensible markup language (VXML) Web browser sessions. The voice anomaly detection patterns may be the same for both analyzers or different for each analyzer. At each installed location, the voice analyzer supports two objects namely the agent and the customer.

Agent station 102-1 has an instance of input action monitor (IAM) 113 installed on the desktop computer of the agent. An instance of IAM 113 may be assumed to be installed at each LAN-connected agent computer and works in the background to monitor characteristics of agent input during interaction with customers. Examples of agent input include typing on the keyboard, mouse manipulation patterns, response time to audio or visual stimulus and the like. In one embodiment certain visual characteristics of an agent may be monitored like agent posture or agent facial expression, for example. More invasive agent input monitoring techniques may also apply in one embodiment, like monitoring of blood pressure, heart rate, eye movement, or the like. In the present example only agent physical inputs, and perhaps, visual posture and response timing to stimuli are monitored during agent interaction.

IAM 113 monitors agents for anomalies in normal input patterns the agent uses and of which the agent is capable. In skill-based routing, for example, calls are routed to agents based on skill of the agent. If an agent is available that has the required skill set to handle the interaction it will likely be routed to that agent. The agent skills are described by the inventor as classic contact-center skills. One of these skills is typing. An agent may be capable of typing 120 words per minute as a skill level for the classic skill of typing.

In typical routing the call is routed to an agent based on the level 120 words per minute regardless of whether or not the agent actually is typing at that level. In one embodiment of the present invention, agent skills are classed as having a maximum level and a minimally acceptable level for routing purposes. Therefore the classic skill of typing has a maximum capability level of 120 words per minute and a minimum acceptable level for routing of, say 80 words per minute. This classification has a third part or variable which is the difference between the maximum and minimum or in this case 40 words per minute. The assumption is that when an agent is fresh and alert and not distracted, the typing skill level of that agent will be at or near maximum level. However, when the agent grows sleepy, bored, gets distracted, becomes agitated, or the like then the typing speed may dip to minimum or below. IAM 113 is adapted to detect when the skill level is affected in real time.

The voice skill level of the agent may also be affected by certain bio-factors. For example, if an agent is fresh, then a script read by the agent will be read promptly in a friendly voice with all of the words correctly enunciated. However, if the agent becomes sleepy, bored or otherwise distracted, or becomes emotional above what is normal for that agent, the voice skill, described as a classic skill, may become affected. A voice skill may also be classified as a three-part model including a maximum dialogue speed of 150 words per minute with 99% dialogue correctness in enunciation, having good tone and inflection. A minimally acceptable voice skill might be a voice speed of 80 words per minute with 85% dialogue correctness in enunciation having only fair tone and inflection. The variable would be 70 spoken words per minute including a 14% variable in dialogue correctness in enunciation and a theoretical difference in voice tone and inflection. Voice tone and inflection models may be created that define what is best and what is not acceptable for voice interaction.

Taking two basic skills, typing and voice, as required skills with a minimum quality level for a certain type of interaction, it can be determined through use of voice analysis and input action analysis which of a number of equally-rated agents are currently performing at maximum levels or less than maximum levels to below acceptable levels during contact center interaction. Therefore, for each agent, an agent bio-performance model (ABPM) 111 is provided and stored in configuration server 108 as data that a routing strategy might consult before determining a best-fit available agent for answering a call. ABPM 111 is a dynamic object model that may be periodically or continually updated by an instance of agent model builder 115 running on interaction server 106.

Agent model builder 115 may reside on its own server or in the configuration or stat servers without departing from the spirit and scope of the present invention. IAM 113 and voice analyzers 110 and 112 report current statistics for each agent during interaction. Those statistics may be reported directly to the appropriate instance of agent model builder for each agent, or they may be stored in stat server 107 and may be subscribed to by the appropriate instance of agent model builder. Agent bio-performance models 111 will exist and be resident as a configuration object for each agent working interaction in the contact center. ABPM may be plugged directly into a skills model for an agent or for a group of agents. Instances of IAM 113 are active only when the agent owning the instance is logged in to the workflow system and engaging in active work within the center. Voice analysis statistics generated during voice interactions are assigned to the correct agent working in the system through a unique agent identifier such as name and extension, or some other identification criteria.

In practice of the present invention, bio-statistics of an agent taken during interaction may be used to update that agent's ABPM in the configuration server by updating the model using agent model builder 115. The resulting model may raise or lower in value compared to similar models of other agents modeling the same classic skills parameters. All skill levels may initially be presumed equal for a group of qualified agents working a specific interaction queue. Preference for one agent over another in routing depends on current statistics regarding the current bio-state of the agent and how the real-time skill performance might be or is affected. In one embodiment fluctuations in actual skill performance level of an agent may be predicted by analyzing bio state of the agent and guessing its impact on the performance of the agent. In another embodiment routing strategy accesses a performance model for each agent available and chooses the best agent to handle the interaction.

In this example, the agent operating station 102 n appears to be unhappy about something. Voice analysis can detect anger or frustration in the agent's spoken voice. Input analysis can detect any abnormal patterns like overly forceful mouse clicks, erratic typing, etc. All other things remaining equal, the agents operating stations 102 1 and 102 2 would continue to receive interactions while the agent operating station 102 n might be suspended from working until the problem is resolved with the agent. From an efficiency standpoint, no customers are exposed to the agent operating station 102 n. The routing optimization therefore results in better customer service by utilizing the higher performing agents of equally defined skills until the underperforming agent can be brought back into play.

The process of real-time performance evaluation of the agent's skills runs in the background and becomes apparent to system administrators when an agent is devalued in the system or is predicted (through analysis) to become devalued. The system works with any realtime interaction including voice and text interactions. In one embodiment the ABPM can be consulted independently in routing so the invention is not limited to skills based routing strategies.

Figure 2:
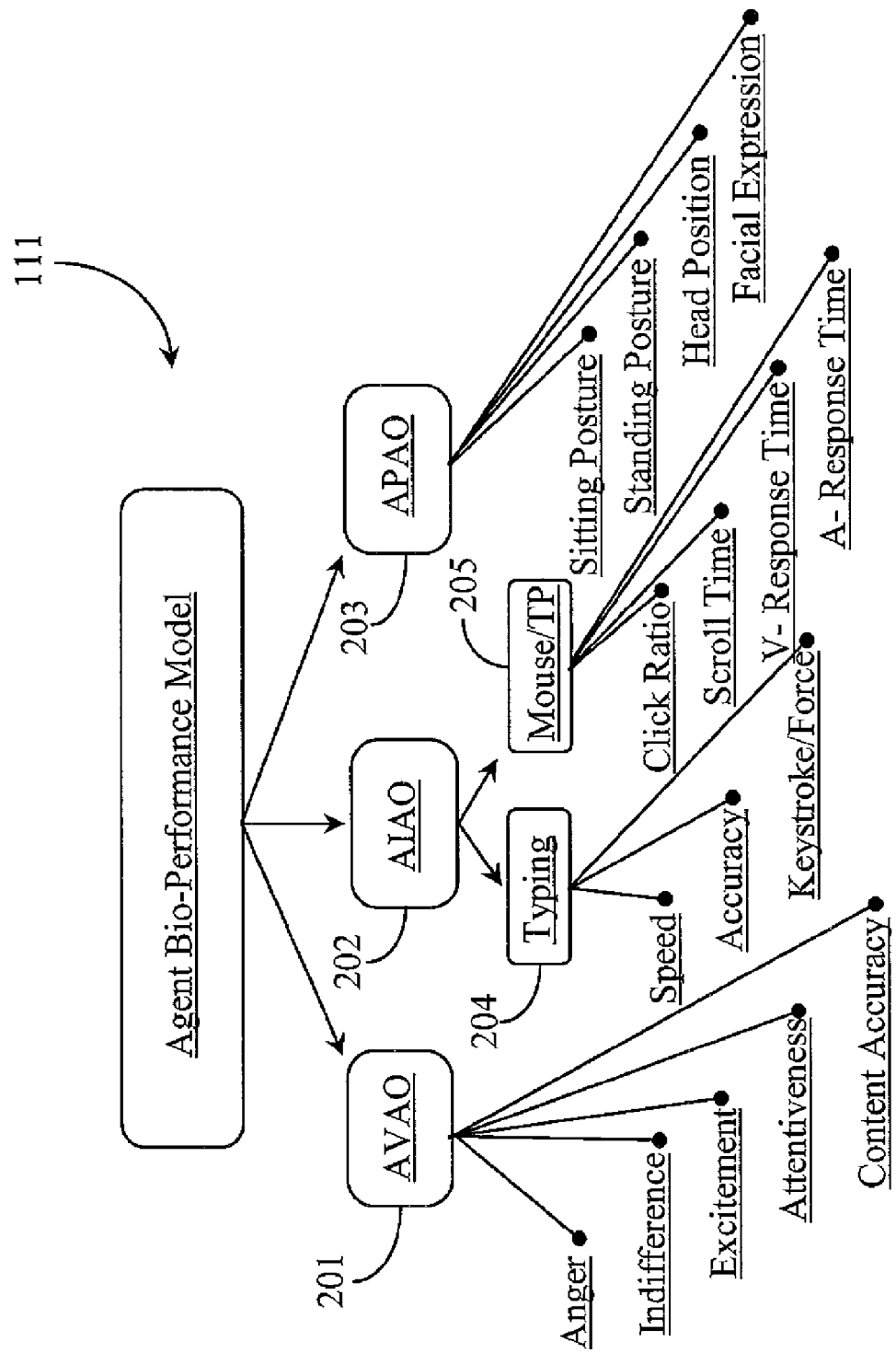
FIG. 2 is a block diagram illustrating elements of an agent bio-performance model according to an embodiment of the present invention.

FIG. 2 is a block diagram illustrating elements of agent bio-performance model 111 of FIG. 1 according to an embodiment of the present invention. ABPM 111 is a configuration model within the contact center environment that represents the current classical skill definition and performance level value related to the skill definition for a contact center agent. ABPM 111 is a dynamic model updated by a model builder such as agent model builder 115 described above. ABPM 111 may be plugged in as an object to an overall agent skills model for the agent or one that represents a unified model for a group of agents working a queue.

For example, 10 agents may be working a queue where all 10 agents must be capable of typing 150 words per minute, speak fluent English, and be able to read dialogue scripting presented to them with 98% accuracy rating. The skills model for those agents is the same skills model for each agent. The skills model may have a minimum acceptance level for all parameters to which all of the agents must demonstrate to be allowed to work the queue. ABPM 111 will be slightly different for each agent because of dynamic statistics used to update each agent instance of the model. These updates may affect the values of the agent skill rating introducing a new vector in the formerly static skills based routing routine. The new vector specifies likely (predictive) or actual performance degradation for each of the stated skill levels to which a minimum level is defined as qualification to work a queue.

ABPM 111 includes or is made up of a number of objects in this embodiment that may include their own attributes. An agent voice analysis object (AVAO) 201 defines an object that reflects current states determined from analyzing the voice of the agent during one or more interactions. Attributes may include a level or indicator of anger, a level or indicator of indifference, a level or indicator of excitement, a level or indicator of attentiveness, and a level or indicator of content accuracy.

Anger can be defined as a sudden rise in decibels coupled with recognition of profanity or a deviance from presented dialogue. Indifference can be inferred from an unacceptable monotone or indifferent sounding voice (minimal inflection). Excitement might be inferred from a less than sudden rise in decibel coupled with a strict adherence to the voice dialogue scripting. Attentiveness may be inferred from response time to customer input or questioning. Content accuracy refers to correctly reciting scripting. Each attribute may hold a value that may be averaged for the AVAO.

ABPM may include another object referred to herein as an agent input analysis object (AVAO) 202. This object can be created from monitoring performed by an instance of IAM 113 described in FIG. 1. Attributes of this object may include an object 204 "Typing" and an object 205 "Mouse/Touch pad". The object "Typing" might include attributes of speed, accuracy, and force of keystroke. These attributes can be directly measured by monitoring so exact or averaged typing speed can be monitored as well as accuracy (correct words, spelling, grammar, etc. In some cases grammar and spelling may not be required to classify a typing object. Force of keystroke can be measured to help determine emotional state assuming that forceful typing above normal keyboard pressure indicates anger. The object typing represents a classic skill that may be defined in a classic agent skills model.

Mouse or touch pad object 205 includes the attributes click ratio, scroll time, visual response time and audio response time. Click ratio may be measured against some standard for a specific scenario such as agent navigation of an interactive application, Web site, or form. Mouse or touch pad click patterns may be determined erratic indicating confusion or distraction. A slow scroll time might indicate confusion, sleepiness, or some other state of distraction. Response times for video and audio measure the time between a visual or audio stimulus and the agent response to the stimulus. For example, if a script appears for the agent to read and the agent fails to read the script in a timely manner, it could be an indication of distraction or indifference. The same is true for audio stimulus. Another example might be measuring response time to a suggestion for an up sell to the customer. A very slow response might be considered a form of indifference or even oppositional defiance to the suggestion.

Another object that might be provided without invasive techniques is an agent posturing analysis object (APAO) 203. This object may be created using a visual monitoring system such as a video camera and associated software. Attributes of such as object might include sitting posture, standing posture, head position, and facial expression. If the agent has poor sitting posture, then typing speed may quickly wane during interaction. If the agent stands up and places his hands on his hips while talking with a customer and paces back and forth it may indicate some level of frustration on the part of the agent. A sagging head position may indicate sleepiness wile facial expressions may indicate a wide range of emotions, some negative.

Each attribute of model 111 may carry a value that can be averaged with other values of other attributes to come up with an overall agent bio-performance rating. Several attributes may confirm other attributes relative to emotional states and levels measured of such states. The goal of the system is to identify and quantify any developing problems with agents that may contribute to underperformance of classic skills of the agents and to prevent routing of interactions to those agents that are not or may not perform according to, at least, minimal expectations.

In one embodiment of the present invention information known about an agent may also be used in weighting when considering agent performance value levels. History data analyzed after a period of time that analysis of an agent's bio-states is performed may indicate rhythms or predicable cycles in which the agent, over time, becomes bored, sleepy, has distractions, or the like. Perhaps agent A typically becomes sleepy some time after lunch in the afternoon and performance of the agent is severely affected by this. Step may be taken to correct the situation by addressing the problem and finding a solution for it. Other patterns may become apparent like better performance during certain times for an agent. One pattern might show better performance under less pressure or fewer peripheral tasks. Mining of these historical statistics provides data that can be used to fine tune agent workflow assignments and scheduling to optimize efficiency within the center in general.

Figure 3:
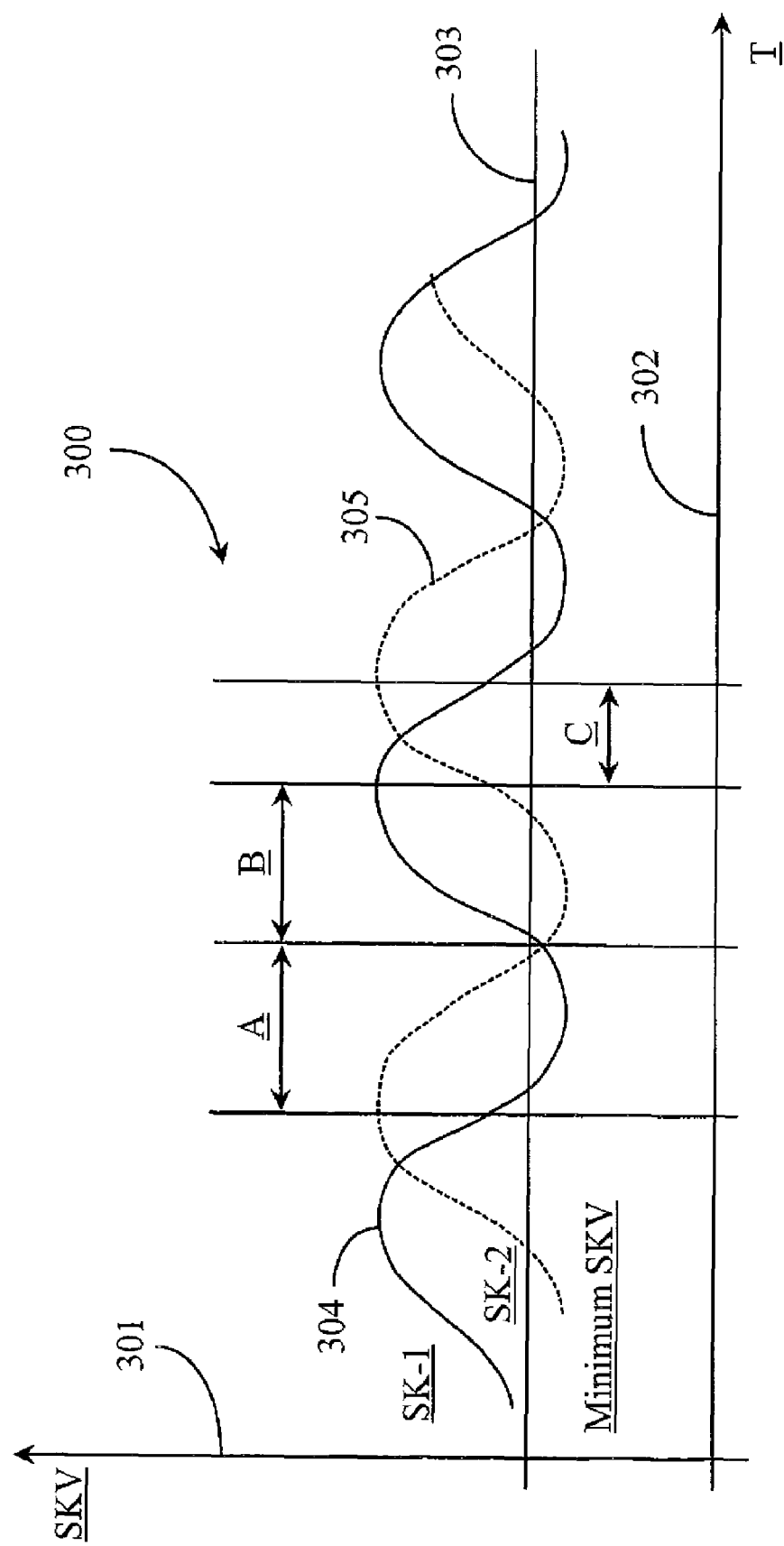
FIG. 3 is a line graph illustrating bio-performance skill levels over time.

FIG. 3 is a line graph 300 illustrating bio-performance affect on skill levels over time. Graph 300 includes a vertical line representing skill value (SKV) measured in units. Line 303 represents a minimum skill value that agents must maintain to be qualified for receiving calls or interactions where that skill is required.

Graph 300 includes a horizontal line representing time measured in units. A sine wave 304 logically represents a skill 1 (SK-1) value represented over time (T). A broken sine wave 305 logically represents a skill 2 (SK-2) value represented over time. One way to interpret this graph is that SK 1 and SK 2 represent skill values of a single agent plotted over time working in the center. The real-time statistics reflected in the agent bio-performance model indicate that the agent dips below the minimum value of both skills periodically. In a time period defined by A, The agent is more proficient in SK-2 and is severely underperforming in SK-1 dipping below the acceptable level. Therefore, routing strategy may determine to route interaction that require only SK-2. In the time period defined as B the router will route only interactions requiring SK-2 to the agent.

At a time period defined as time period C, routing strategy may route interactions requiring either or both skills to the agent as the agent is performing both skills well (above minimum value) at that period. In one embodiment SK-1 and SK-2 may represent the same skill and the two instances plotted on the graph represent two agents working the queue. In such a case in window A the router will route the interactions only to one agent owning skill SK-2 while within time window B the router routes all of the interactions to the agent owning skill SK-1). So out of two agents, one is preferable to the other within those time windows. In time window C the interactions are routed to both agents because their performance levels are relatively equal and above the minimally accepted level.

Figure 4:
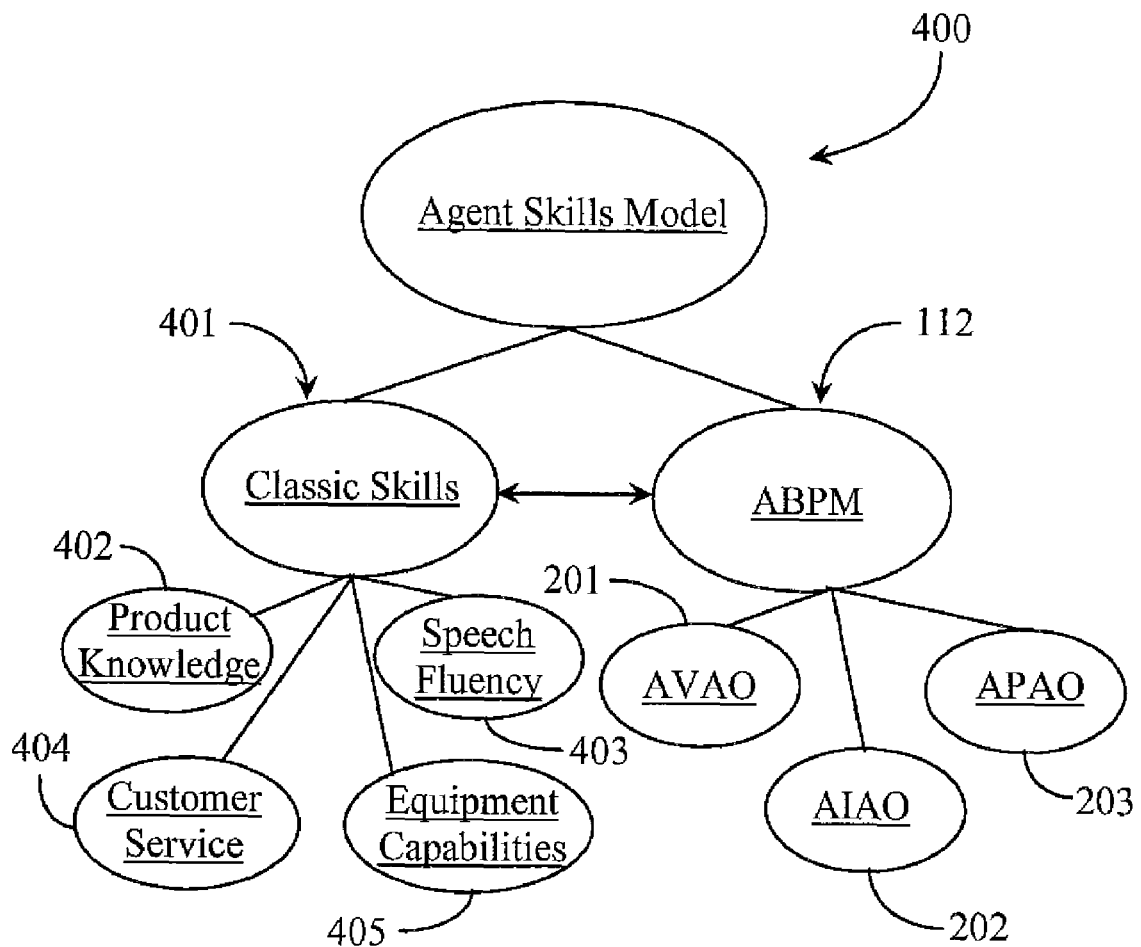
FIG. 4 is a block diagram illustrating an agent skills model according to an embodiment of the present invention.

FIG. 4 is a block diagram illustrating an agent skills model 400 according to an embodiment of the present invention. Agent skills model 400 includes a classic skills object 401 that defines the classic skills of an agent. Classic skills object 401 may include attributes defining agent skills such as a product knowledge object 402, a customer service object 404, a speech fluency object 403, and an equipment capability object 405. Each of the objects under classic skills object 401 may have further attributes particularly defining agent classic skills including expected capability values and minimally accepted values. Other classifications may be provided in place of or in addition to objects 402-405 without departing from the spirit and scope of the invention. Agent classic skills definitions may vary widely according to the nature of the contact center environment. Objects 402-405 are exemplary only and should not be construed as limiting.

Agent bio-performance model (ABPM) 112 is part of agent skills model 400 and defines the bio states or skills of the agent. ABPM 112 is dynamic and it may affect or change values of the classic skills object. The relationship between ABPM 112 and the classic skills object 401 is illustrated by a bi-directional arrow. Attributes under ABPM 112 are illustrated and described further above with respect to FIG. 2. A model building engine such as model builder 115 of FIG. 1 is used to update skills model 400 by propagating updates from the lower objects engaged in analysis.

Agent skills model 400 may be considered a dynamic model with ABPM object 112 integrated to it. As agent states of behavior are discovered by the system, the attribute data are propagated to the model builder, which uses the data to perform an update. Classic skill levels of agents may be predicted to fall based on dynamic information in the ABPM. Some skills are directly affected such as typing for example. Other skills might be indirectly affected by data from the ABPM. For example, if AVAO 201 discovers that the agent is nervous, speech fluency skills may be affected but are not necessarily affected. If more than one negative state occurs that might affect speech fluency then proactive measures such as redirection of all calls to other agents may be performed on a temporary basis. ABPM is the dynamic component of the agent skills model (ASM).

It will be apparent to one with skill in the art of object modeling and dynamic objects that the classifications of the objects and object attributes may vary widely and may be customizable to relative contact center goals and existing capabilities. Agent skills largely depend on the nature of the center. An agent may be a technical support person, a direct sales person, an administrative person, or a combination of these.

Figure 5:
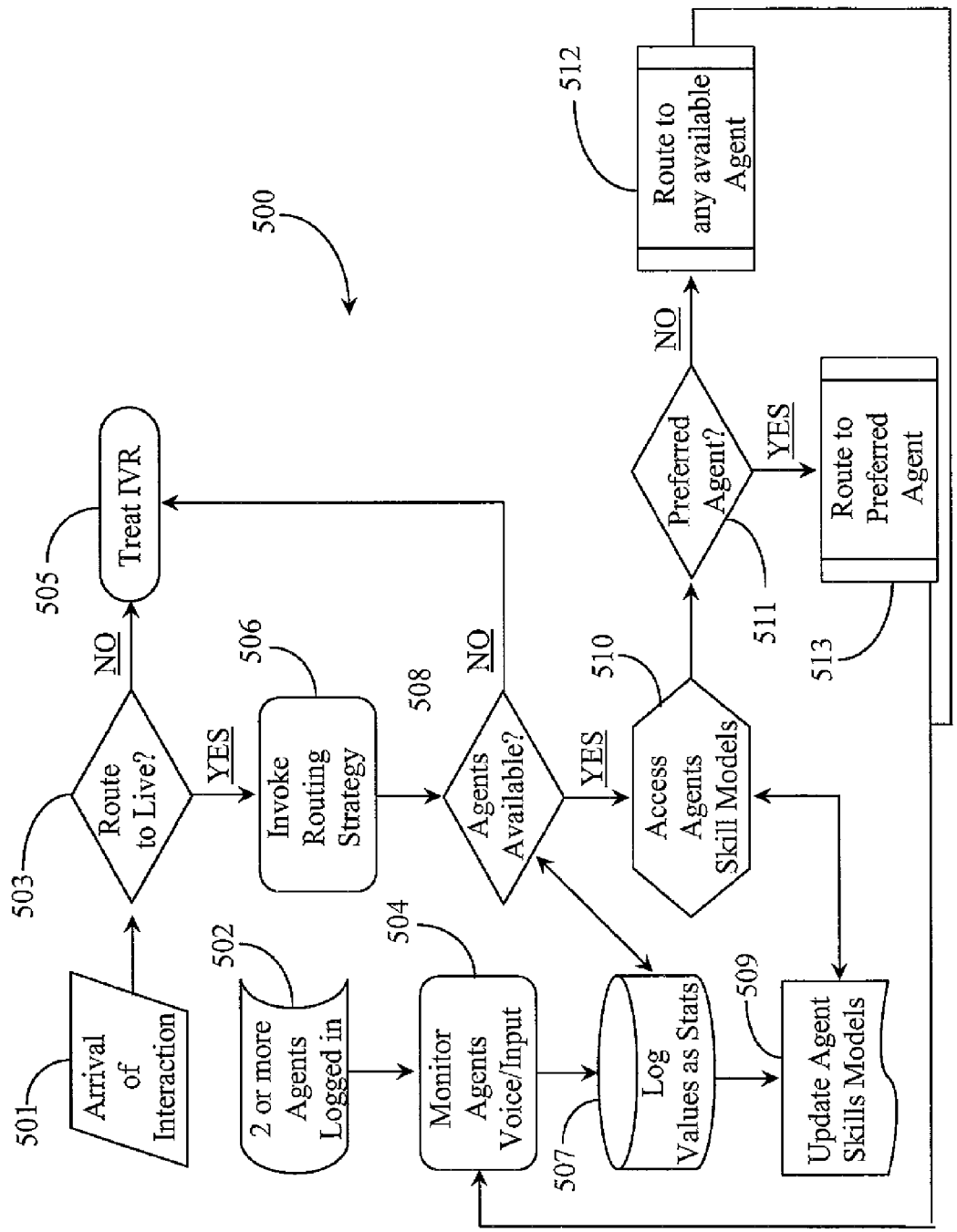
FIG. 5 is a process flow chart illustrating steps for routing an interaction according to bio-skill level.

FIG. 5 is a process flow chart illustrating steps 500 for routing an interaction according to bio-skill level. This process assumes the interaction is a voice call. At step 501 the call event arrives within the contact center. The interaction will, most likely, be treated at least initially by IVR to determine the nature of the interaction and what treatment if any might be required.

At step 503 the IVR system determines whether live assistance is required to handle the call. If the caller can use self-help treatment then at step 505 the call is simply handled by IVR treatment. If at step 503 the system decides the caller needs live assistance then at step 506 a routing strategy is invoked to route the call.

Referring now to a parallel process step, at step 502 there are two or more agents logged into the system taking calls. One of these agents may be available to take the call of step 501. At step 504 in the parallel process, the system monitors the voice and input actions of the agents using a voice analyzer like analyzer 110 of FIG. 1 and an input action monitor like IAM 113 of FIG. 1 on the agent desktops. At step 507 in the parallel process the data from the agent voice and input monitoring is logged as statistics. The statistics may be stored in a statistics server subscribed to by an agent model builder. The data logged comprises interaction data that involved interactions that occurred previous to the routing of the interaction of step 501 at step 506.

Referring now back to the routing process, at step 508 the routing strategy checks statistics to determine if any agents are currently available to take the call. If at step 508 there are no agents available to take the call then the process may loop back to step 505 resuming IVR treatment.

Referring now to the parallel process, a model builder subscribing to the stat server of step 507 obtains agent statistics and updates the agent's skills models at step 509. In this embodiment the agent's skill models have the dynamic ABPM component and are updated according to a change-based or time-based update process.

Referring now back the routing process, if at step 508 two or more of the agents of step 502 are available, then at step 510 the routing strategy access the skill models of the available agents to determine if there are any preferred agents. A preferred agent will be one who is exhibiting a better skill value than another for a same skill.

At step 511 the system makes the determination and if there is no preferred agent than the call is routed to any available agent of the same skill set at step 512. If at step 511 there is a preferred agent identified, then at step 513 the call is routed to the preferred agent. In the case of only one available agent at step 508, the call will be routed to the agent unless the skill value is below the minimum accepted level for the skill set required to handle the call. The routing process connects to the parallel process at step 504 from steps 512 or 513 where monitoring continues in the current interaction with the live agent.

Figure 6:
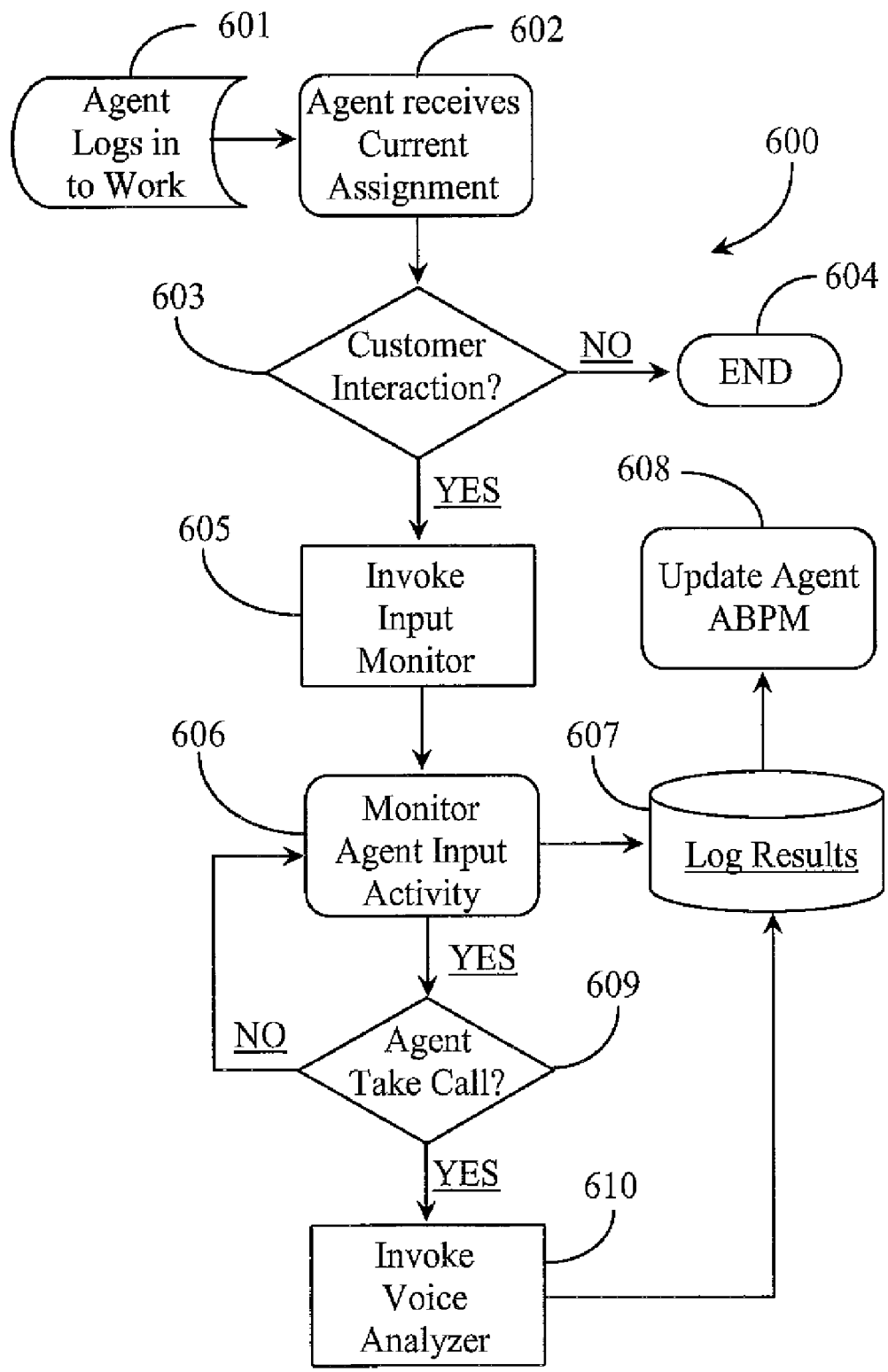
FIG. 6 is a process flow chart illustrating steps for updating an agent's bio-performance model according to an embodiment of the present invention.

FIG. 6 is a process flow chart illustrating steps 600 for updating an agent's bio-performance model according to an embodiment of the present invention. At step 601 an agent for a contact center logs into the system to work. At step 602 the agent receives a current assignment. At step 603 the system determines if the agent will handle customer interaction. If the agent will not engage in customer interaction then at step 604 the process ends for that agent.

At step 603 if it is determined the agent will engage in customer interaction then at step 605 an input action monitor, analogous to IAM 113 of FIG. 1 is invoked to monitor the agent's input actions such as typing and mouse manipulations. In one embodiment agent posture head position and facial expressions may be monitored in addition to typing and mouse manipulations. Time to respond to visual and audio stimuli may also be monitored. At step 606 the agent's input activity is monitored.

At step 607 the results of monitoring at step 606 are logged into a statistics database. At step 609 the system determines if the agent takes a voice call. If at step 609 the agent is not engaged in a voice call then the process resolves back to step 605, which may be ongoing during the time that the agent is assigned to engage in interaction with customers.

If at step 609 the agent takes a call, then at step 610 the system monitors the call and invokes a voice analyzer. The voice analyzer may support both the agent and the customer. The agent's voice is analyzed and the results are logged into the statistics database for that agent back at step 607. Steps 606 and 610 are ongoing steps with step 610 repeated each time the agent takes a call. At step 608, the bio-skill model is updated from the statistics using a model builder. The update process may be performed when results change significantly (change based) or on a basis of time (periodically). The agent bio-performance model is a dynamic component of the agent skills model in a preferred embodiment.

In one embodiment of the present invention a runtime performance engine is provided to determine if bio-performance has affected an agent's skill value during routing. Some values may be directly propagated within the model like typing speed if typing speed is a defined skill value in the model. Some skill values may be predicatively changed by determining a change in bio-state and consulting history to determine an average reduction in a skill value that occurred in the past with discovery of the same change. The system may adjust the skill value predicatively before the actual value drop or rise occurs in the performance of the skill.

The routing process can determine which of equally skilled and available agents is preferred at the time of routing an interaction. The routing intelligence can also rely on the process to determine if an agent will be withheld calls based on under performance of a particular skill set. The information may also serve as an indicator for agent allocation intelligence based on bio-state of the agent and the predicted or real effect on skill level or value.

It will be apparent to one with skill in the art that the bio-performance modeling and routing system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system for routing an interaction comprising:
a queue for staging the interaction;
a router running a routing strategy for routing the interaction; and
a unique object model maintained for each of a number of agents, the object model defining values for one or more agent skills and bio-performance for each associated agent, the values of the object models dynamically affected by real-time bio-metrics of the agents obtained through ongoing monitoring of voice and input actions of the agents;
characterized in that the values related to bio-performance in the object model are analyzed to predict and modify skill value in the object model, and the routing strategy routes the interaction to an agent based on comparison of the values of the agent's object model.

2. The system of claim 1 wherein the object models are configuration objects updated with current bio-metrics using a model builder.

3. The system of claim 1 wherein the values of skills are modified based on real-time performance data.

4. The system of claim 1 wherein one or more of the agents are temporarily excluded from receiving the interaction based on one or more values of skills being modified to a level below one or more system-established minimum values.

5. The system of claim 1 wherein the interaction is a voice call and bio-performance characteristics used to modify values of skills in routing the interaction include emotional state, language fluency, and script recitation accuracy of the agents determined through voice analysis during previous calls.

6. The system of claim 1 wherein the interaction is a text interaction and the bio-performance characteristics used to modify values of skills in routing the interaction include typing proficiency, force of keystroke, visual or audio response time, and mouse click patterns of the agents determined through input action analysis during previous text interactions.

7. The system of claim 1 wherein the interaction is a text and or voice interaction and the bio-performance characteristics used to modify values of skills in routing the interaction include sitting posture, standing posture, head position, and facial expression of the agents determined through visual monitoring of the agent.

8. A method for representing real or predictive fluctuations in values of skills of an agent assigned to live interaction for use in routing comprising the steps:
(a) modeling one or more skills of the agent as a unique configuration model with skill value attributes for each skill defined, the configuration model stored and associated with the agent;
(b) modeling one or more bio-performance states of the agent as a bio-performance object integral to the configuration model;
(c) monitoring the bio-metrics of the agent during live interaction;
(d) discovering during monitoring one or more changes in one or more bio-performance states of the agent by comparison to the bio-performance object within the stored configuration model;
(e) updating the one or more bio-performance state changes to the bio-performance object;
(f) changing one or more of the skill value attributes according to the updated state changes; and (g) routing incoming live interactions according to the updated configuration model;

wherein the values related to bio-performance in the object model are analyzed to predict and modify skill value in the object model, and the routing strategy routes the interaction to an agent based on comparison of the values of the agent's object model.

9. The method of claim 8 wherein in step (a) the model is an agent configuration object accessible from a configuration server.

10. The method of claim 8 wherein in step (b) one or more bio-performance states have value attributes.

11. The method of claim 8 wherein in step (c) monitoring is accomplished by a voice analyzer and associated software and an agent input action monitor and associated software.

12. The method of claim 8 wherein in step (c) visual monitoring of the agent is also performed.

13. The method of claim 8 wherein in step (e) updates are performed by a model builder.

14. The method of claim 8 wherein in step (f) the changes are based on real performance data or predictive analysis, including historical analysis of past changes.

* * * * *